Patented Nov. 17, 1936

2,061,200

UNITED STATES PATENT OFFICE 2,061,200

INDIGOID COMPOUNDS CONTAINING FLUORINE

Herbert A. Lubs and Arthur L. Fox, Wilmington, Del., assignors to E. I. du Pont de Nemours & Company, Wilmington, Del., a corporation of Delaware No Drawing. Application April 3, 1933, Serial No. 664,283

2 Claims. (Cl. 260—52)

This invention relates to organic fluorine compounds, more particularly indigoid dyes containing fluorine, and methods for the manufacture thereof.

It is an object of the invention to produce new organic fluorine compounds. A further object is the preparation of a wide variety of new indigoid dyes containing fluorine, either as a direct nuclear substituent or as an integral part of a side chain. A more specific object is the production of new thioindigoid dyes which contain fluorine. Other objects will appear hereinafter.

These objects are accomplished by the preparation of compounds containing the nucleus:

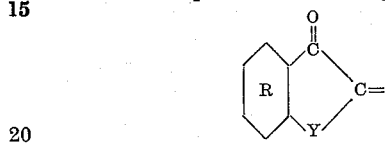

wherein R represents an aryl radical containing fluorine, either as a direct nuclear substituent or as an integral part of a side chain, and Y represents S or NH. Some of these new compounds which we have found to be particularly valuable are those containing the following nuclei:

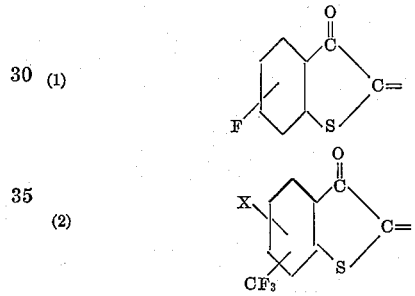

(1)

(2)

where X represents hydrogen or halogen.

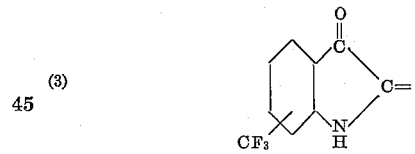

(3)

While the invention is susceptible to considerable variation and modification in the manner of its practical application, particularly as regards the nature of the starting materials, temperatures, proportions of materials, and the exact method of procedure, the following examples will illustrate some of the products falling within the invention and how they may be prepared.

Example I

The following substances were placed in a bomb and heated for five hours at 165° C.:

| | |
|---|---|
| 5-fluoro-1-amino-benzothiazole _____gms__ | 10 |
| NaOH solid_____do____ | 10 |
| Water _____cc__ | 60 |

The bomb was then cooled down, opened, and the resultant product treated with:

| | |
|---|---|
| Chloracetic acid_____gms__ | 9 |
| Water _____cc__ | 20 |

This was warmed on the steam bath to 90° C., then cooled and filtered free from iron. To the filtrate was added:

| | |
|---|---|
| Sodium nitrite_____gms__ | 4.2 |
| Water _____cc__ | 10.2 |

This mixture was poured slowly into

| | |
|---|---|
| Concentrated sulfuric acid_____cc__ | 13 |
| Ice_____gms__ | 15 |

This was kept in an ice bath during the addition and the temperature was not allowed to rise over 5° C. When the diazotization was complete, it was neutralized with solid sodium carbonate. This neutralized solution was added slowly at 75° C. to a solution of

| | Cubic centimeter |
|---|---|
| 20% copper sulfate solution_____ | 84 |
| 20% sodium cyanide solution (enough to insure complete solution)_____ | 90 |

During the addition of the diazo solution, the temperature may rise to 90° C. When all the diazo solution had been added, it was stirred 10 minutes and to this was added

| | Grams |
|---|---|
| NaOH (flake)_____ | 21 |
| Na₂S.9H₂O _____ | 14 |

$Na_2S.9H_2O$

The charge was heated one hour at 90° C., and to it was added

| | Grams |
|---|---|
| NaCl _____ | 60 |

It was then cooled to 15° C. to 20° C. and filtered. The solid was dissolved in 400 cc. boiling water to which had been added one cc. 30% NaOH. Bone black was added and it was filtered. The filtrate was added to

| | |
|---|---|
| $H_2SO_4$_____gms__ | 15 |
| $H_2O$ _____cc__ | 80 | and kept at 80° C. one-half hour. The thioindoxyl was quite volatile. It was cooled and filtered. The thioindoxyl produced most probably had one of the following formulas:

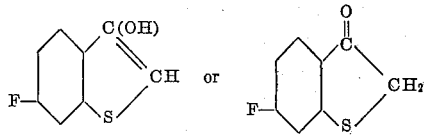

This thioindoxyl was dissolved in NaOH and treated with a solution of sodium polysulfide at 75° C. to 80° C. The dye thus formed was filtered off and washed. It dyed cotton a bright orange shade showing exceptional fastness to light. This most probably has the following structure:

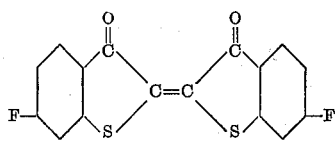

*Example II*

The following ingredients were mixed and heated to the boil under reflux:

|   | Grams |
|---|---|
| Thioindoxyl of Example I | 16.8 |
| Acenaphthe quinone | 18.2 |
| Alcohol | 200.0 |

One cc. piperidine was then added and condensation took place at once. The dye was filtered off and washed. The formula of this dye is most probably:

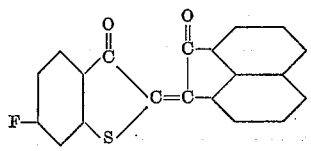

*Example III*

Sixteen and eight tenths grams of the fluor thioindoxyl of Example I were dissolved in 50 cc. of chlorbenzene and the solution was added to a solution of dibrom isatin chloride prepared from

| Dibrom isatin | gms | 30.0 |
| Phosphorous pentachloride | do | 25.6 |
| Chlorbenzene | cc | 100.0 |

The dye precipitated at once and after slight further stirring was filtered off, washed and dried. The structure of this dye most probably is as follows:

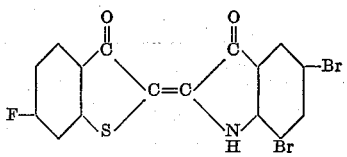

*Example IV*

The following substances were mixed together, cooled to 0° C., and diazotized at this temperature:

| p-Fluor aniline | gms | 55 |
| Water | cc | 800 |
| Concentrated hydrochloric acid | do | 85 |

This diazo solution was then added slowly to a solution of:

| Potassium xanthate | gms | 125 |
| Sodium carbonate | do | 165 |
| Water | cc | 800 | with efficient stirring and keeping the temperature at 75° C.–80° C. during the entire addition. On cooling, the oil was separated and hydrolyzed by the use of caustic in alcohol in the presence of chloracetic acid. After the hydrolysis the alcohol was distilled off and the alkaline solution filtered through bone black. The filtrate was precipitated with acid and the pure white thioglycollic acid filtered off and dried.

Eighteen and six-tenths grams of this thioglycollic acid were added gradually to a well-cooled solution of 4 cc. of ethylene dichloride in 38 cc. of chloro sulfonic acid. The mixture was stirred fifteen hours, being allowed to gradually come up to room temperature. It was then drowned and the dye filtered off, washed well, and dried. It most probably has the following formula:

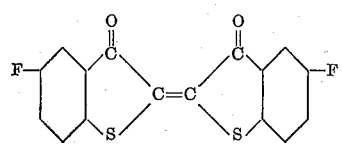

*Example V*

Starting with 100 gms. of phenyl fluoroform hydrochloride

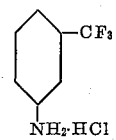

and following the directions in Example IV, the 3-trifluor methyl thioglycollic acid was obtained

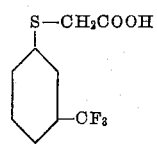

This product had a melting range from about 53.5° C. to about 55° C.

The thioglycollic acid was ring closed with chloro sulfonic acid as in Example IV, giving one or the other of the following dyes, or a mixture of them:

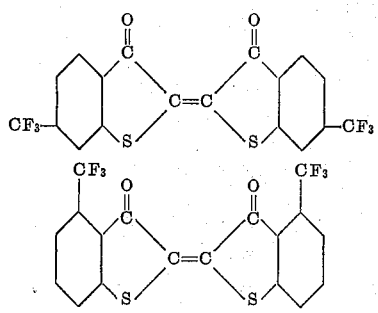

This dyed a pink shade.

*Example VI*

One hundred grams of phenyl fluoroform hydro-chloride and 800 grams of sulfur chloride were heated with stirring at 90° C. to 95° C. for thirty hours, then treated with benzene and the condensation product filtered off. This was treated with 3000 cc. of water for six hours, filtered and the precipitate suspended in 300 cc. of water and 300 cc. of alcohol and treated with NaOH slowly until permanent alkalinity. This solution was then treated with Sodium chloracetate_____gms__ 50
Water_____cc__ 200

The solution was then warmed to 90° C. for thirty minutes, filtered and cooled. Acid was then added and the anhydride filtered off. (Melting range, 230° C. to 231° C.)

Fifteen grams of this anhydride were heated with 45 cc. NaOH and 15 cc. of water until complete solution. This solution was diluted and treated with acid to faint turbidity, and 4.6 grams of $NaNO_2$ were added. When this was all dissolved, the solution was gradually added to 60 cc. HCl and 20 gms. ice. This diazo was replaced by a nitrile group and the product carried to the thioindoxyl by the well known reactions. The formula of this thioindoxyl depends on the direction the ring closed in the sulfur chloride step. It, of course, contains chlorine para to the nitrogen which entered in the sulfur chloride step. The formula for this thioindoxyl most probably is as follows:

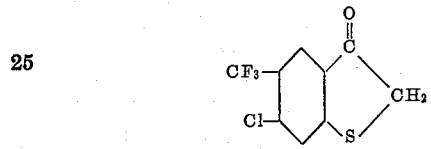

or

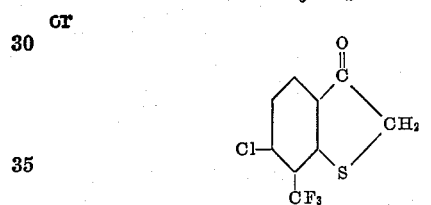

This thioindoxyl was converted to a dye by dissolving it in dilute sodium hydroxide and treating with potassium ferricyanide. The dye gives a pink shade on cotton. It has either of the following structures:

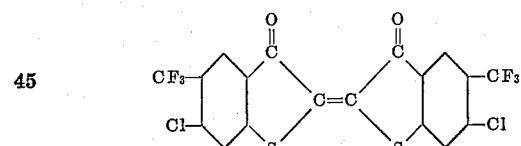

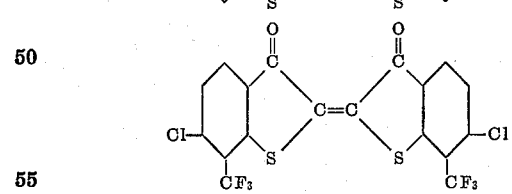

Example VII

Four and five-tenths grams of the thioindoxyl, prepared as in Example VI, 3 grams of acenaphthe quinone, and 200 cc. of alcohol were heated to the boil under reflux, but no action took place until a few drops of piperidine were added. Then condensation took place rapidly and the dye was filtered off. It gave an orange-pink shade on cotton and most probably has either or both of the following structures:

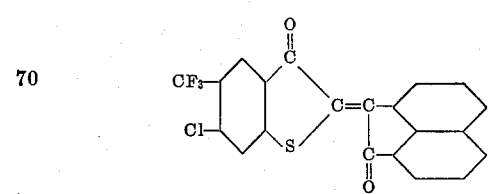

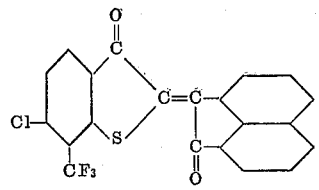

Example VIII

Five grams of the thioindoxyl prepared as in Example VI and 10 cc. of chlorbenzene were mixed and added to a solution of dibrom isatin chloride prepared from 6 grams dibrom isatin, 6 grams phosphorus pentachloride and 60 cc. chlorbenzene. The formation of dye occurred quickly, but the dye was quite soluble in the solution. It was filtered off and dried. The structure of this dye most probably is as follows:

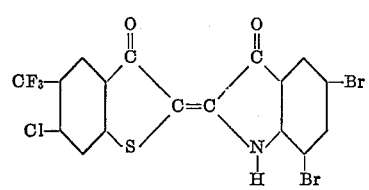

or

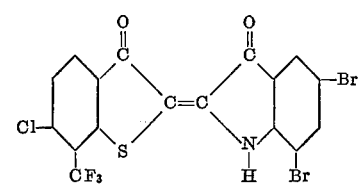

Example IX

The following substances were mixed and stirred until dissolved:

| | Grams |
|---|---|
| Chloral hydrate | 90 |
| Water | 1925 |
| Anhydrous sodium sulfate | 575 |

To the resultant solution was added a solution of

| | |
|---|---|
| m-Amino phenyl fluoroform hydrochloride_____gms__ | 89 |
| Water_____cc__ | 300 |
| Hydrochloric acid_____cc__ | 3 |

This addition caused a white precipitate. The product was then treated with

| | |
|---|---|
| Hydroxylamine hydrochloride_____gms__ | 110 |
| Water_____cc__ | 500 |

This mixture was heated at such a rate that boiling took place in forty-five minutes. It was then heated at the boil for half an hour and allowed to stand twenty-four hours. The solid material was filtered off.

This is the trifluor methyl isonitroso acetanilide (melting range 144° C. to 146° C.) and has the following structure:

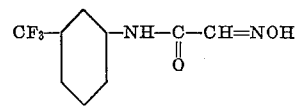

Ten grams of this trifluor methyl isonitroso acetanilide were added to 40 cc. of concentrated $H_2SO_4$ at 50° C.–60° C. The temperature was maintained at 50° C. to 60° C. for fourteen hours and then the mixture was stirred seventy-two hours at room temperature and drowned in ice. The trifluor methyl isatin was filtered off and dried. By analysis the nitrogen content was 6.93%; the melting range was 203° C. to 204° C. It most probably has one of the formulas:

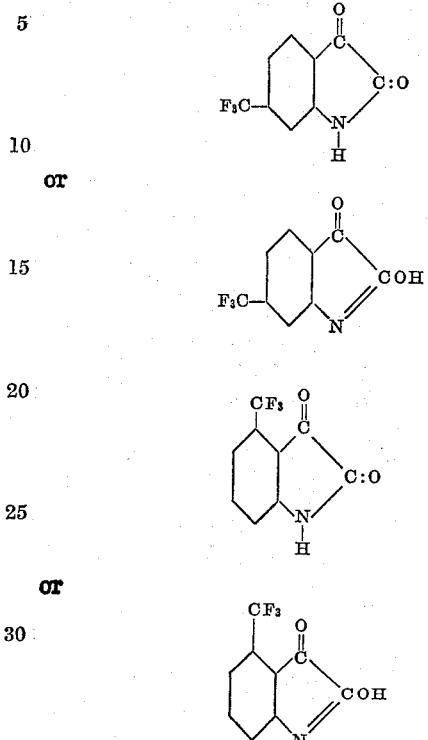

Twelve and five-tenths grams of trifluor methyl isatin, 12.5 grams of phosphorus pentachloride and 75 cc. of chlorbenzene were warmed together until complete solution had occurred and then hydrogen sulfide was passed through the solution until complete formation of the dye. The dye was then filtered off but appeared quite soluble in the solvent. The color was a very greenish blue. The structure is either or both of the following:

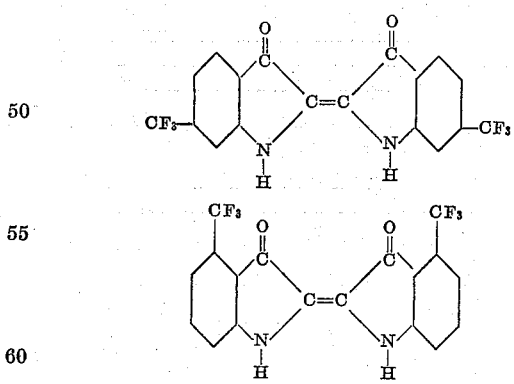

*Example X*

The following substances were warmed until complete solution occurred:
Trifluor methyl isatin from
  Example IX _____ gms___ 2.15
Phosphorus pentachloride _____ gms___ 2.10
Chlorbenzene _____ cc___ 20.0

To this solution was added a solution of 2 grams of 3-hydroxy-4-methyl-6-chloro-thionaphthene in 30 cc. of chlorbenzene. Condensation occurred, giving a violet color but this was completely soluble in the solvent. The solvent was removed by steam distillation and the residue acid pasted and drowned. It was a reddish violet shade and has either or both of the following structures:

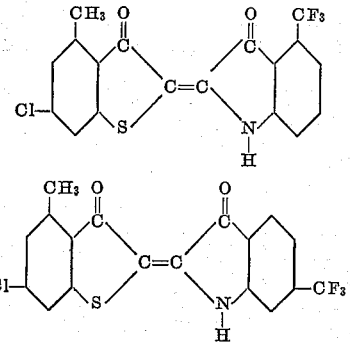

According to procedures similar to those described in the examples, other indigoid dyes may be prepared from the intermediates containing fluorine. The compounds produced may contain, in addition to fluorine, other substituents, for example, halogens (e. g., chlorine or bromine), alkyl radicals (methyl, ethyl, isopropyl, butyl, etc.), or alkoxy radicals (methoxy, ethoxy, butyloxy, etc.).

Insofar as is known, prior to this invention no indigoid dyes have been described which contain fluorine in the molecule. These compounds are valuable products, being useful in many instances for dyeing cotton, cellulose acetate, and other cellulosic fibers, fabrics and yarns. They may also be used in some cases for coloring organic liquids, for coloring rubber, as pigments, in printing pastes for printing textile fabrics, in discharge dye pastes, and for a wide variety of purposes to which dyes of the indigoid series have been applied.

As many apparently widely different embodiments of this invention may be made without departing from the spirit and scope thereof, it is to be understood that we do not limit ourselves to the specific embodiments thereof except as set forth in the following claims.

We claim:
1. An indigoid dye having the following general formula:

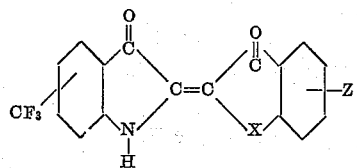

in which X represents a radical selected from the group consisting of —S— and —NH, and Z represents a radical selected from the group consisting of —F and —CF₃.

2. A compound having the following general formula:

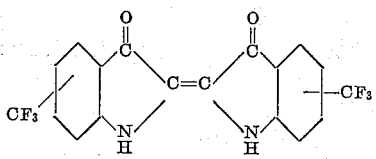

HERBERT A. LUBS.
ARTHUR L. FOX.

CERTIFICATE OF CORRECTION.

Patent No. 2,061,200.  November 17, 1936.

HERBERT A. LUBS, ET AL.

It is hereby certified that error appears in the printed specification of the above numbered patent requiring correction as follows: Page 1, second column, line 20, in the table, for "10.2" read 10.0; and that the said Letters Patent should be read with this correction therein that the same may conform to the record of the case in the Patent Office.

Signed and sealed this 23rd day of February, A. D. 1937.

(Seal)

Henry Van Arsdale
Acting Commissioner of Patents.